US008816882B2

(12) United States Patent
Boedeker

(10) Patent No.: US 8,816,882 B2
(45) Date of Patent: Aug. 26, 2014

(54) PORTABLE LANDING PAD MARKER AND METHOD FOR USING THE SAME

(76) Inventor: Douglas W. Boedeker, Washington Court House, OH (US)

( * ) Notice: Subject to any disclaimer, the term of this patent is extended or adjusted under 35 U.S.C. 154(b) by 0 days.

(21) Appl. No.: 13/468,600

(22) Filed: May 10, 2012

(65) Prior Publication Data

US 2013/0021172 A1 Jan. 24, 2013

Related U.S. Application Data

(60) Provisional application No. 61/484,438, filed on May 10, 2011.

(51) Int. Cl.
*B64F 1/18* (2006.01)
*G08G 5/00* (2006.01)
*B64F 1/20* (2006.01)

(52) U.S. Cl.
CPC .................................. *B64F 1/20* (2013.01)
USPC ............................... 340/953; 340/954

(58) Field of Classification Search
CPC ............. B64F 1/007; B64F 1/18–1/20; B06Q 7/00–7/02
USPC ........ 340/947–954; 342/350, 357.53; 362/84; 244/114
See application file for complete search history.

(56) References Cited

U.S. PATENT DOCUMENTS

| 2,667,000 | A | 1/1954 | O'Connor |
| 3,496,904 | A | 2/1970 | Rimkus |
| 4,197,807 | A | 4/1980 | Campbell |
| 4,256,050 | A | 3/1981 | Barnard |
| 4,768,136 | A * | 8/1988 | Tashjian .......................... 362/84 |
| 4,827,245 | A * | 5/1989 | Lipman .......................... 340/321 |
| 5,115,343 | A | 5/1992 | Bennett |
| 5,305,705 | A | 4/1994 | Gagliano |
| 5,577,687 | A * | 11/1996 | Downing .................. 244/110 E |
| 6,928,952 | B2 | 8/2005 | Garcia |
| 7,108,446 | B2 | 9/2006 | Clark |
| 7,391,340 | B2 | 6/2008 | Malhomme |
| 7,538,688 | B1 | 5/2009 | Stewart |
| 7,666,682 | B2 | 2/2010 | Armentrout et al. |
| 2002/0104472 | A1* | 8/2002 | Neubert ........................ 116/209 |
| 2005/0084975 | A1* | 4/2005 | Armentrout et al. ............ 436/56 |
| 2006/0170568 | A1* | 8/2006 | Malhomme .................... 340/981 |
| 2008/0036584 | A1* | 2/2008 | Lang et al. .................... 340/473 |
| 2008/0068714 | A1* | 3/2008 | Ruest .............................. 359/549 |
| 2010/0156758 | A1* | 6/2010 | Anders .............................. 345/8 |

FOREIGN PATENT DOCUMENTS

WO    WO 98/41448 A1 *  9/1998  ............... B64F 1/20

* cited by examiner

*Primary Examiner* — Tai T Nguyen
*Assistant Examiner* — Orlando Bousono
(74) *Attorney, Agent, or Firm* — Benesch Friedlander Coplan & Aronoff LLP

(57) ABSTRACT

A portable landing pad marker includes a base, a light source, a light cover, at least two stacking indents, and at least two raised stacking pins. The portable landing pad marker may also include a collapsible traffic cone in the base of the marker and have a portion of the base removed to form a handle to easily transport the markers. The portable landing pad marker may also include a base that is at least partially visible with night vision equipment.

22 Claims, 5 Drawing Sheets

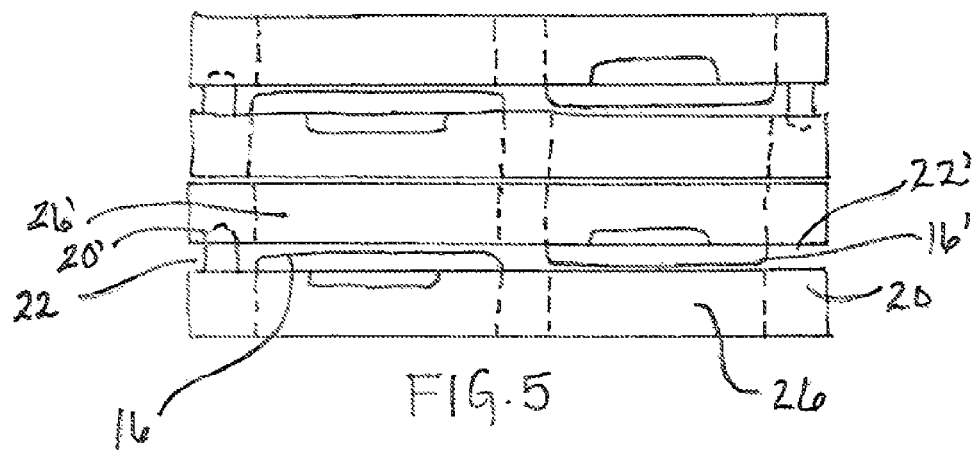

PORTABLE LANDING PAD MARKER AND METHOD FOR USING THE SAME

RELATED APPLICATIONS

This application claims priority to U.S. Provisional Patent Application No. 61/484,438, filed on May 10, 2011, entitled Portable Landing Pad Marker and Method for Using the Same.

FIELD OF THE INVENTION

This invention relates to a portable landing pad marker and method for using the same. More specifically, the portable landing pad marker may be used by military, police, fire, emergency medical services, and civilian personnel to facilitate the landing of a helicopter or other airborne vehicle.

BACKGROUND

Traditionally traffic markers, such as cones, have been used by military, police, fire, emergency medical services, and other civilian personnel to delineate the landing pad for airborne vehicles, such as helicopters, in areas where permanent landing pads are not feasible or practical, such as the scene of a traffic accident, in rural areas, or in the battle field. Traditional cones, however, are not stable enough to withstand the wind and/or air movement created by the downward thrust of the incoming airborne vehicle. As such, the cones generally topple over onto their sides or blow away all together, leaving the pilot without an accurate means to determine where he or she is to land their aircraft.

In addition, transporting bulky traffic cones can be cumbersome, occupy a lot of space, are heavy, and awkward for personnel who are depended on to be efficient and timely in their response to traffic accidents, battlefield injuries, and other life and death situations.

SUMMARY

A method of demarcating a temporary landing area includes providing at least a first portable landing pad marker and a second portable landing pad marker; each portable landing pad marker including a base, a first light source disposed within the base, a light cover, at least two stacking indents, and at least two raised stacking pins. The method may also include positioning the first portable landing pad maker and the second pad maker in a pattern sufficient to delineate a temporary landing area and activating the first light source in the first portable landing pad marker and the first light source in the second portable landing pad marker. The first light source may be capable of being activated remotely.

In another embodiment, the method may also include deactivating the first light source in the first portable landing pad marker and the first light source in the second portable landing pad marker, removing first portable landing pad marker and the second portable landing pad marker from the temporary landing area, and stacking first portable landing pad marker and the second portable landing pad marker so that the stacking pins of the first portable landing pad marker are disposed within the stacking indents of the second portable landing pad marker.

The method may also include providing a collapsible cone disposed within the base of the landing pad markers and a second light source within the collapsible cone. In this embodiment, the method may include moving the collapsible cones from a storage position to an extended position, activating the first light source and the second light source in the first portable landing pad marker, activating the first light source and the second light source in the second portable landing pad marker. The second light source may activated automatically when the collapsible cone is moved from the storage position to the extended position or remotely.

DESCRIPTION OF THE DRAWINGS

The accompanying drawings, which are incorporated in and constitute a part of the specification, illustrate various example systems, methods, and so on, that illustrate various example embodiments of a portable landing pad marker. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 5 is a side view of another embodiment of portable landing pad markers.

DETAILED DESCRIPTION

Figure 1:
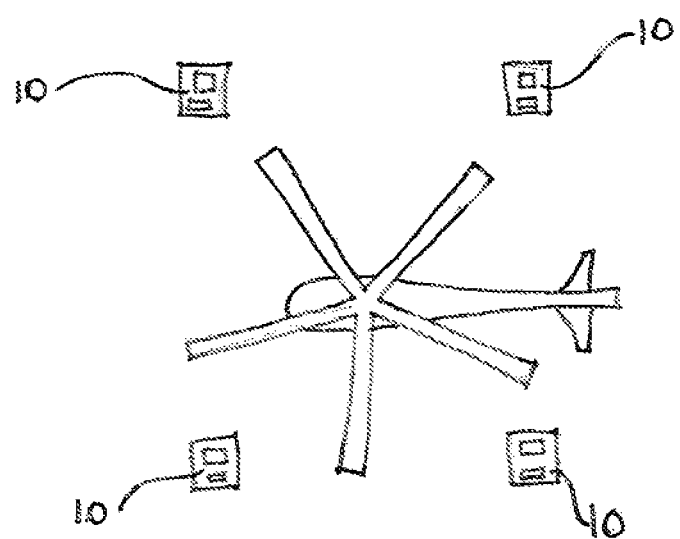
FIG. 1 is a top view of portable landing pad markers used to delineate a temporary landing pad.

Portable landing pad markers 10 may be used to aid military, police, fire, emergency medical services, or other civilian personnel in delineating the area in which an airborne vehicle, such as a hospital transport helicopter, is to land. The portable landing pad marker 10 may be used in sets of four to clearly mark a square, or other similarly shaped, landing area as shown in FIG. 1. It is contemplated that the markers 10 may also be used in sets of less than or more than four to denote different landing pad patterns, such as a long rectangular landing strip for an airplane.

Figure 2:
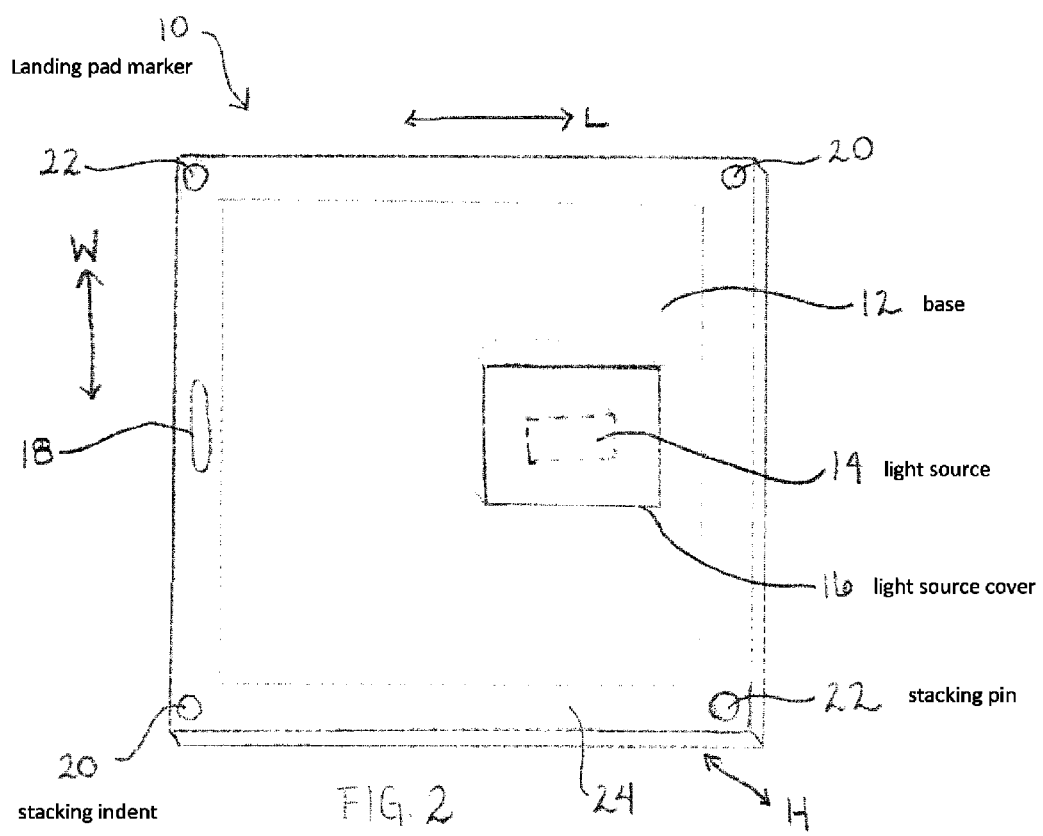
FIG. 2 is a top view of a portable landing pad marker.

One embodiment of a portable landing pad marker 10 is shown in FIG. 2. This embodiment comprises a base 12, a light source 14, a light cover 16, a carrying handle 18, at least two stacking indents 20, and at least two raised stacking pins 22.

The base 12 is generally square or rectangular; other peripheral shapes, e.g., circular, triangular, octagonal, etc., are contemplated, however. The base 12 may be made from recycled rubber or other suitable material, but is generally heavy enough to maintain its position against the force of a landing aircraft. For the purposes of this description, the aircraft will be referred to as a helicopter, although use with other airborne vehicles is contemplated.

The base 12 may be made from a material that is fluorescent orange or aviation green in color or may be coated with a fluorescent orange (or green) coating, such as polymer film. The orange fluorescent color will enable pilots to easily locate the markers from the air, however, the base 12 may be made of other suitable colors. In one embodiment, the base may have a perimeter 24 around the outer edge of the upper surface of the base. The perimeter 24 may be coated with a substance that can be seen with night vision equipment. Any suitable coating material may be used to delineate he perimeter 24 of the base. Alternatively, the perimeter 24 may be made of a night vision compatible material and integrally formed as part of the base 12. Any suitable night vision compatible material, such as photoluminescent materials.

The base 12 may have a length L of about 15 inches to about 25 inches, a width W of about 15 inches to about 25, and a height H of about one to about four inches, although it is contemplated that the base may be made in various sizes and shapes. In one embodiment, the base has a length L and a width W of about 20 inches and a height H of two inches. In one embodiment, the base 12 may include a handle 18. The handle 18 may be formed within the base 12, as shown in FIG. 1, by removing a portion of the base 12 and forming an opening within the base so that the hand of a user can easily pass through. The base 12 may also be molded or formed with an opening therethrough to create the handle 18.

As shown in FIG. 1, the portable landing pad marker 10 may also include a light source 14 and a light cover 16. In one embodiment, the light may be a strobe light, a light emitting diode, infrared lighting, or other suitable device, that produces light sufficient to indicate the position of the portable landing pad marker to a pilot landing a helicopter in the dark. Moreover, the light source 14 may be manually controlled by known means of operation, such as being powered by a battery source and controlled remotely by an infrared or radio frequency transmitter, or by Wi-Fi, Bluetooth, or other suitable non-wired means. In another embodiment, the light source 14 may be connected to an electrical source with wires. In this embodiment, the base 12 could be connected to a mobile electrical power source or be hardwired to a permanent or fixed location, such as a known landing area.

The light cover 16 may generally be constructed of a hard plastic or other suitable transparent or translucent material, such that the light source 14 beneath the cover 16 may be easily seen through the cover 16, but may be sufficiently protected from the elements. In one embodiment, the light cover 16 may have four sides that extend from the upper surface of the base 12 and a top that is generally parallel with the base. It is also contemplated that the light cover may be rounded or take other suitable shapes.

The top of the light cover 12 may be coated with an opaque coating that is fluorescent orange, aviation green, or any other suitable color, to match the color of the base 12, while the sides of the light cover 16 remain uncoated so that light is directed out of the sides of the light cover 16 across the upper surface of the base 12. In another embodiment, the light cover 16 may be completely coated with a transparent orange, or other appropriately hued, film so that the light emitted from the light source 14 appears orange (or green) in color but is still sufficiently bright that it can be seen by approaching pilots.

Figure 3:
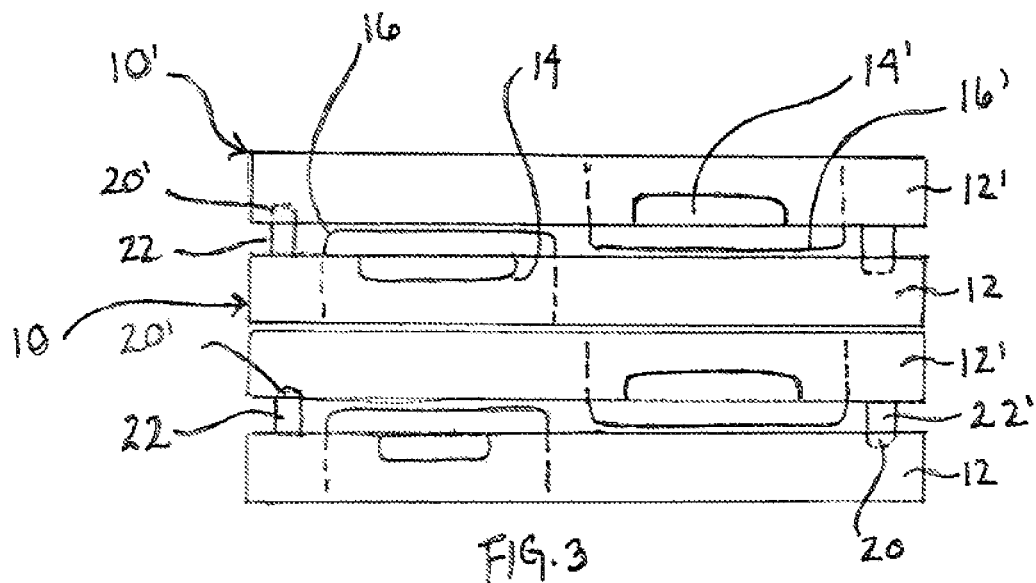
FIG. 3 is a side view of portable landing pad markers.

It is contemplated that the light source 14 is disposed within the base 12 and that the light cover 16 may be molded or inserted into the base 12 during its forming process or may be fitted within the base 12 after the base 12 has been formed. In one embodiment, the light cover 16 is approximately six inches by four inches and the sides of the light cover 16 protrude no more than about 0.75 inches from the upper surface of the base 12, as shown in FIG. 3. It is contemplated that the light cover 16 may be various shapes and sizes.

As shown in FIG. 3, the portable landing pad marker 10 may be stacked with the upper surfaces of the respective bases 12 facing. As such, a set of four can be neatly stacked in the back of a pick-up truck, SUV, car trunk, or other tight space so that the complete set takes up no more than area of about 20 inches long and wide and about 10 inches high. Moreover, stacking of the portable landing pad markers 10 is aided by the incorporation of stacking indents 20 and raised pins 22.

As shown in FIG. 1, two stacking indents 20 and two stacking pins 22 are located at the four corners of the base 12. In one embodiment the stacking indents are disposed within the base 12 at the first and third corner, while the stacking pins 22 protrude from the second and fourth corners of the base 12. In this embodiment, the base 12 is about two inches thick, the stacking indents 20 are about 0.375 inches deep, and the stacking pins 22 protrude from the upper surface of the base about 1.25 inches, however other dimensions are contemplated. When two portable landing pad markers 10 and 10' are stacked with the upper surfaces of the respective bases 12 and 12' facing, the stacking pins 22 and 22' at the second and fourth corners of the respective bases 12 and 12' fit into the stacking indents 20 and 20' formed in the third and first corners, respectively, of the opposite base, as shown in FIG. 3.

In this embodiment, the stacking pins 22 fit into the mating stacking indents 20 such that an about 0.875 inch space separates the upper surfaces of the bases 12 and 12'. The space between the stacked bases 12 and 12' should be large enough that the light cover 16 that protrudes from the upper surface of the base 12 does not obstruct the stacking mechanism of the portable landing pad markers 10. In another embodiment, not shown, instead of, or in addition to, the stacking indents 20 and stacking pins 22, the base 12 of the marker 10 may include four holes in the corners of the base 12. The holes in the corners of the base allow the user to permanently or semi-permanently mount the landing pad marker 10 to a ground surface with screws, tent stakes, or other suitable fastening mechanism.

In one embodiment, the light cover 16 protrudes from the upper surface of the base 12 about 0.75 inches, thereby fitting within the 0.875 inch space created by the stacking pins 22 and indents 20. Desirably, the top of the light cover 16 does not contact the upper surface of the stacked base 12' so that the top of the light cover is not scratched by dirt and other debris that may be on the base of the opposing base 12'.

Also, as shown in FIG. 3, the light source 14 and the light cover 16 are positioned off-center on the base 12. This positioning allows the portable landing pad markers to be stacked with the respective upper surfaces of the bases 12 facing.

Figure 4:
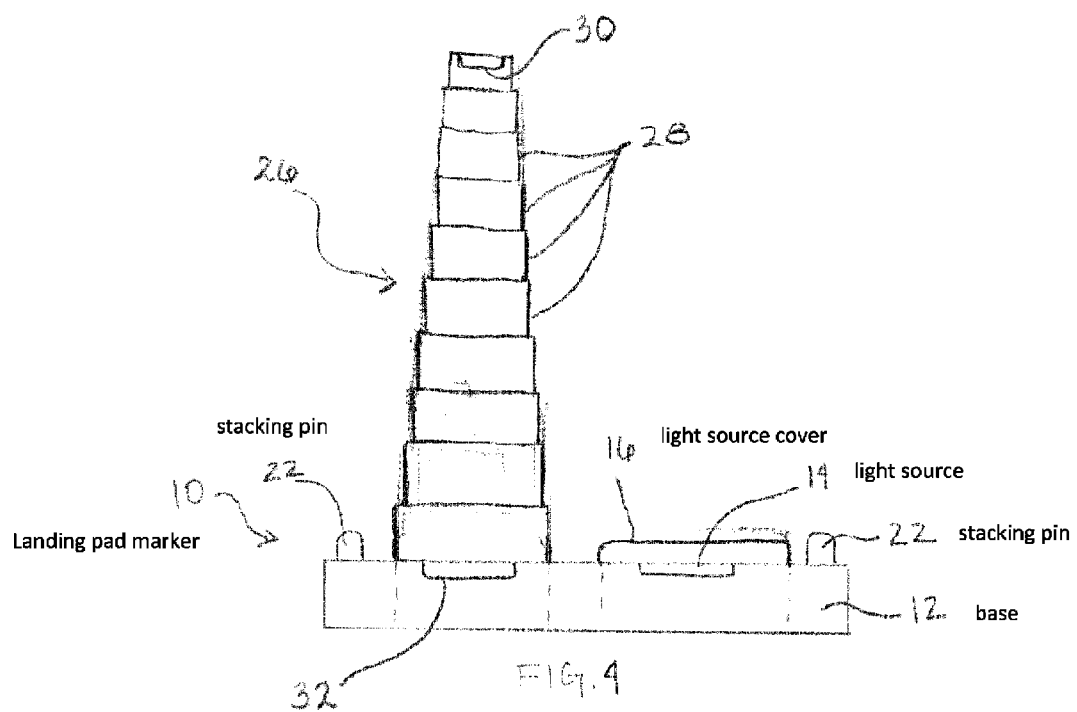
FIG. 4 is a side view of another embodiment of a portable landing pad marker.

In yet another embodiment, the portable landing pad marker 10 may include a collapsible cone 26. As shown in FIG. 4, the cone 26 may be constructed of alternating fluorescent orange and white collapsible cone segments 28. The collapsible cone segments are locked in either of two states, an upper, extended state and a lower, storage state. Any known locking mechanism can be used. In the lower, storage state, as shown in FIG. 5, the cone 24 fits within the base 12 of the portable landing pad marker 10, such that the collapsed cone does not interfere with the stacking feature of the markers 10.

The cone segments 28 may be moved to an upper position by pulling a handle 30 (strap or other suitable grasping mechanism) located on the top, innermost cone segment, upwards and locking all of the cone segments 28 into an extended state, as shown in FIG. 4. In one embodiment, the marker 10 includes an additional light source or LED 32, other suitable light source, in the base of the cone 26 that is activated when the cone segments 28 are locked into an extended state. The LED 32 may also be disposed on the top of the cone 26. The LED 32 in the base of the cone may be independent of the light source 14. Like the light source 14, the LED may also be activated manually or be battery powered and controlled remotely by an infrared or radio frequency transmitter, or by Wi-Fi, Bluetooth, or other suitable non-wired means.

Portable landing pad markers 10 are designed to be used in the field to clearly and distinctly delineate safety zones. As such, they must be both of sufficient number to accomplish the goals and portable enough to be effectively deployed quickly and easily. The military and emergency/first responder applications of the portable landing pad markers 10 are many. The portable landing pad markers 10, unlike traditional traffic cones, may also be easily transported to and from the temporary landing areas in a carrying case constructed of canvas or other suitable material.

In one embodiment, the landing pad markers 10 may be transported to and from landing areas by stacking the markers 10 and 10' so that the top surfaces of the markers 10 and 10' are facing and the respective stacking pins 22 and 22' and indents 20 and 20' are aligned. The markers 10 may be deployed, as shown in FIG. 1, in a variety of patters, but generally in a pattern that demarcates the landing area for an airborne vehicle, such as a helicopter. After the markers 10 are deployed, the markers may be affixed to the landing area by inserting stakes through holes in the corners of the base 12. Once in place, the light source 14 may be activated to illuminate the outline of the landing area.

In another embodiment, the markers include a collapsible cone 26. The cone may be used to provide further demarcation of the landing area. In this embodiment, once in place, the collapsible cone 26 may be extended to protrude from the base 12. The extension of the cone 26 may activate an additional light source located in the base or top of the cone 26. Alternatively, the additional light source 32 may be independently activated by remote controlled means once the cone 26 is extended.

While example devices and methods of use have been illustrated by describing examples, and while the examples have been described in considerable detail, it is not the intention of the applicant to restrict or in any way limit the scope of the appended claims to such detail. It is, of course, not possible to describe every conceivable combination of components or methodologies for purposes of describing the systems, methods, devices, and so on, described herein. Additional advantages and modifications will readily appear to those skilled in the art. Therefore, the invention is not limited to the specific details, the portable landing pad marker 10, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A portable landing pad marker, comprising:
a substantially planar base, a first light source disposed within the base that can be either remotely or locally activated, a light source cover, at least two stacking indents disposed within an upper surface of the substantially planar base, at least two stacking pins that protrude from the upper surface of the substantially planar base, a handle, and a means for seeing the landing pad marking with night vision equipment;
wherein the means for seeing the portable landing pad marker with night vision equipment comprises providing a coating material disposed on at least a portion of the base that can be seen with night vision equipment or making the base from a material that can be seen with night vision equipment.

2. The portable landing pad marker of claim 1, wherein the substantially planar base comprises recycled rubber.

3. The portable landing pad marker of claim 1, wherein the coating material is disposed about a perimeter of the substantially planar base.

4. The portable landing pad marker of claim 1, wherein the first light source is selected from the group consisting of a strobe light, a light emitting diode, an incandescent light, and an infrared light.

5. The portable landing pad marker of claim 1, wherein the light source cover protrudes from the upper surface of the substantially planar base.

6. The portable landing pad marker of claim 1, wherein the portable landing pad marker further comprises a collapsible cone capable of being moved from a storage position to an extended position.

7. The portable landing pad marker of claim 1, wherein the light source cover further comprises a top that is covered with an opaque coating.

8. The portable landing pad marker of claim 6, wherein the collapsible cone further comprises a second light source.

9. The portable landing pad marker of claim 7, wherein the opaque coating can be seen with night vision equipment.

10. A method of demarcating a temporary landing area comprising:
providing at least a first portable landing pad marker and a second portable landing pad marker; at least the first portable landing pad marker comprising a substantially planar base, a first light source disposed within the base that can be either remotely activated or locally activated, a light source cover, at least two stacking indents disposed within an upper surface of the substantially planar base, at least two stacking pins that protrude from the upper surface of the substantially planar base, a handle, and a means for seeing the first landing pad marker with night vision equipment;
wherein the means for seeing the first landing pad marker with night vision equipment comprises providing a coating material disposed on at least a portion of the substantially planar base that can be seen with night vision equipment or making the substantially planar base from a material that can be seen with night vision equipment.

11. The method of claim 10, the method further comprising positioning the first portable landing pad maker and the second portable landing pad maker in a pattern sufficient to delineate the temporary landing area.

12. The method of claim 10, wherein the first portable landing pad marker further comprises a collapsible cone disposed within the substantially planar base.

13. The method of claim 11, wherein the method further comprises the step of activating the first light source in the first portable landing pad marker and a first light source in the second portable landing pad marker.

14. The method of claim 13, wherein the method further comprises:
deactivating the first light source in the first portable landing pad marker and the first light source in the second portable landing pad marker;
removing the first portable landing pad marker and the second portable landing pad marker from the temporary landing area; and
stacking the first portable landing pad marker and the second portable landing pad marker so that the stacking pins of the first portable landing pad marker are disposed within stacking indents of the second portable landing pad marker.

15. The method of claim 12, wherein the collapsible cone further comprises a second light source.

16. The method of claim 13, the method further comprising positioning the first portable landing pad maker and the second portable landing pad maker in a pattern sufficient to delineate the temporary landing area.

17. The method of claim 16, wherein the method further comprises the step of moving the collapsible cones from a storage position to an extended position.

18. The method of claim 17, wherein the method further comprises the step of activating the first light source and the second light source in the first portable landing pad marker and a first light source and a second light source in the second portable landing pad marker.

19. The method of claim 18, wherein the first light source of the second portable landing pad marker is capable of being activated remotely.

20. The method of claim 18, wherein the second light source of the first portable landing pad marker is activated automatically when the collapsible cone is moved from the storage position to the extended position.

21. The method of claim 18, wherein the second light source of the second portable landing pad marker is capable of being activated remotely.

22. The method of claim 18, wherein the method further comprises:
- moving the collapsible cones from the extended position to the storage position;
- deactivating the first light source in the first portable landing pad marker and the first light source in the second portable landing pad marker;
- removing the first portable landing pad marker and the second portable landing pad marker from the temporary landing area; and
- stacking the first portable landing pad marker and the second portable landing pad marker so that the stacking pins of the first portable landing pad marker are disposed within stacking indents of the second portable landing pad marker.

* * * * *